(12) United States Patent
Wu et al.

(10) Patent No.: US 7,768,451 B2
(45) Date of Patent: Aug. 3, 2010

(54) METHODS AND APPARATUS FOR GEOMETRY EXTRA-REDUNDANT ALMOST FIXED SOLUTIONS

(75) Inventors: Shuwu Wu, Foothill Ranch, CA (US);
Stephen R. Peck, West Hills, CA (US);
Robert M. Fries, Irvine, CA (US); Peter D. Shloss, Los Alamitos, CA (US)

(73) Assignee: Raytheon Company, Waltham, MA (US)

( * ) Notice: Subject to any disclaimer, the term of this patent is extended or adjusted under 35 U.S.C. 154(b) by 207 days.

(21) Appl. No.: 11/781,562

(22) Filed: Jul. 23, 2007

(65) Prior Publication Data
US 2009/0027262 A1    Jan. 29, 2009

(51) Int. Cl.
*G01S 19/40* (2010.01)
*G01S 19/44* (2010.01)
(52) U.S. Cl. .......................... 342/357.23; 342/357.27
(58) Field of Classification Search .............. 342/357.02
See application file for complete search history.

(56) References Cited

U.S. PATENT DOCUMENTS

| | | | |
|---|---|---|---|
| 6,204,806 B1 * | 3/2001 | Hoech | 342/357.02 |
| 6,466,846 B2 * | 10/2002 | Maynard | 701/13 |
| 6,753,810 B1 | 6/2004 | Yang et al. | |
| 6,873,810 B2 | 6/2004 | Yang et al. | |
| 6,847,893 B1 * | 1/2005 | Lupash | 701/213 |
| 6,856,905 B2 * | 2/2005 | Pasturel et al. | 701/214 |
| 6,970,785 B2 * | 11/2005 | Derambure et al. | 701/207 |
| 7,436,354 B2 * | 10/2008 | Lee | 342/357.02 |

FOREIGN PATENT DOCUMENTS

EP    1729145 A1 * 12/2006

OTHER PUBLICATIONS

Walter et al, "Weighted RAIM For Precision Approach," Proceedings of the ION GPS, 1995, p. 1-10.*
Enge et al, "Local Area Augmentation of GPS for the Precision Approach of Aircraft," Proceedings of the IEEE, vol. 87, # 1, Jan. 1999, p. 111-132.*
Henkel et al, "Integrity Analysis of Cascaded Integer Resolution with Decorrelation Transformations," Proceedings of the 2007 National Technical Meeting of the ION, Jan. 2007, p. 903-910.*
Rife et al, "Core Overbounding and its Implications for LAAS Integrity," 17th International Technical Meeting of the Satellite Division ION GNSS, Sep. 2004, p. 2810-2821.*
Invitation to Pay Additional Fees and, Where Applicable, Protest Fees, PCT/US2008/067092, dated Jun. 26, 2009, 8 pages.

(Continued)

*Primary Examiner*—Gregory C Issing
(74) *Attorney, Agent, or Firm*—Daly, Crowley, Mofford & Durkee, LLP

(57) ABSTRACT

Methods and apparatus for providing high integrity probability of connect fix (PCF) in GPS navigation applications, such as precision approach and landing and airborne refueling. In an exemplary embodiment, an enlarged pull in region is used to compute protection levels. In an exemplary embodiment, geometric extra-redundancy is used to enhance PCF and PAF (probability of almost fixed). In an exemplary embodiment, geometric extra-redundancy almost fixed solutions provide superior accuracy and integrity for GPS navigation applications.

22 Claims, 5 Drawing Sheets

OTHER PUBLICATIONS

P. Henkel and C. Gunther, Integrity Analysis of Cascaded Integer Resolution with Decorrelation Transformations, Jan. 2007, San Diego, California pp. 903-910.

P.J.G. Teunissen, Statistical GNSS Carrier Phase Ambiguity Resolution: A Review, Department of Mathematical Geodesy and Positioning, Delft University of Technology, 2001, IEEE, pp. 4-12.

Gary A. McGraw, Rockwell Collins, Generalized Divergence-Free Carrier Smoothing with Applications to Dual Frequency Differential GPS, Monterey, California, 2006, pp. 293-300.

Notification of Transmittal of the International Search Report dated Sep. 8, 2009, PCT/US2008/067092.

The International Search Report dated Sep. 8, 2009, PCT/US2008/067092.

Written Opinion of the International Searching Authority dated Sep. 8, 2009, PCT/US2008/067092.

P. Henkel and C. Gunther, Integrity Analysis of Cascaded Integer Resolution with Decorrelation Transformations, Jan. 2007, pp. 903-910.

P.J.G. Teunissen, Statistical GNSS Carrier Phase Ambiguity Resolution: A Review, IEEE 2001, pp. 4-12.

Gary A. McGraw, Rockwell Collins, Generalized Divergence-Free Carrier Smoothing with Applications to Dual Frequency Differential GPS, Jan. 2006, pp. 293-300.

* cited by examiner

METHODS AND APPARATUS FOR GEOMETRY EXTRA-REDUNDANT ALMOST FIXED SOLUTIONS

BACKGROUND

As is know in the art, satellite navigation systems, such as the global positioning system (GPS), enable a receiver to determine a location from ranging signals received from a plurality of satellites. Position can be determined from code and/or carrier phase information. A code division multiple access (CDMA) code is transmitted by the GPS satellites at 1 MHz for civilian applications and 10 MHz for military applications. The codes from the GPS satellites are correlated with replica codes to determine ranges to different satellites. Accuracy is enhanced using real-time kinematic processing of carrier phase information.

Exemplary techniques for carrier phase integer ambiguity resolution or fixing are shown and described in U.S. Pat. No. 7,205,939 to Zimmerman, U.S. Pat. No. 6,753,810 to Yang et al, and U.S. Pat. No. 6,697,736 to Lin, all of which are incorporated herein by reference. Accuracy at the level of tens of centimeters is possible with real-time kinematic (RTK) carrier phase integer ambiguity resolution.

As is known in the art, certain applications require very accurate positional location information. For example, inflight aircraft refueling requires precise positioning for successful operations. Prior art navigation techniques for such applications include double difference-based architectures that employ real-time kinematics. While such systems may be adequate for some applications, other applications, such as precision approach and landing systems and autonomous airborne refueling may have more demanding navigation and integrity requirements unmet by existing systems.

SUMMARY

The present invention provides methods and apparatus for GPS navigation applications having high integrity and high accuracy requirements. In an exemplary embodiment, an extended pull-in region (EPIR) is selected so that a probability of almost fixed (PAF) over the EPIR meets an integrity requirement. With this arrangement, stringent accuracy and integrity requirements can be met. While the invention is primarily shown and described in conjunction with certain applications, it is understood that the invention is applicable to navigation applications in general for which it is desirable to meet accuracy and integrity requirements.

In one aspect of the invention, a method comprises selecting almost fixed solutions with a correctly fixed solution to form an extended pull-in region (EPIR) so that a probability of almost fixed (PAF) over the EPIR meets an integrity allocation, computing protection levels including effects of incorrect fixes associated with the almost fixed solutions in the EPIR, and outputting a relative navigation solution based upon the EPIR.

In another aspect of the invention, a method comprises generating a relative navigation solution by a fixed solution from the GPS observables, ensuring a probability of correct fix (PCF) value in integer ambiguity resolution to exceed a threshold value, and computing protection levels by: selecting almost fixed solutions with a correctly fixed solution to form an extended pull-in region (EPIR) so that a probability of almost fixed (PAF) over the EPIR meets an integrity allocation, computing protection levels including effects of incorrect fixes associated with the almost fixed solutions in the EPIR, and outputting a relative navigation solution based upon the EPIR.

In a further aspect of the invention, a method comprises collecting two or more sets of reference GPS information, correcting the reference GPS information to a common reference point, combining the two or more sets of reference GPS information with one or more sets of user GPS information to form GPS observables for relative positioning, and using two or more sets of combined GPS observables for carrier phase integer ambiguity resolution for a common relative baseline vector.

In another aspect of the invention, a method comprises collecting two or more sets of reference GPS information, correcting the reference GPS information to a common reference point, combining the two or more sets of reference GPS information with one or more sets of user GPS information to form two or more sets of GPS observables for relative positioning, using the two or more sets of combined GPS observables for carrier phase integer ambiguity resolution for a common relative baseline vector, generating a relative navigation solution by a fixed solution from the GPS observables, ensuring a probability of correct fix (PCF) value in integer ambiguity resolution to exceed a threshold value, selecting almost fixed solutions with correctly fixed solution to form an extended pull-in region (EPIR) so that a probability of almost fixed (PAF) over the EPIR meets an integrity allocation, and computing protection levels including effects of incorrect fixes associated with the almost fixed solutions in the EPIR.

In a further aspect of the invention, a system includes an interface to collect two or more sets of reference GPS information corrected to a common reference point, an observable module to combine the two or more sets of reference GPS information with one or more sets of user GPS information to form two or more sets of GPS observables for relative positioning, a GER module to use the two or more sets of combined GPS observables for carrier phase integer ambiguity resolution for a common relative baseline vector, a PCF/PAF module to generate a relative navigation solution by a fixed solution from the GPS observables, to ensure a probability of correct fix (PCF) value in integer ambiguity resolution to exceed a threshold value, and to select almost fixed solutions with correctly fixed solution to form an extended pull-in region (EPIR) so that a probability of almost fixed (PAF) over the EPIR meets an integrity allocation, and a position module to compute protection levels including effects of incorrect fixes associated with the almost fixed solutions in the EPIR.

BRIEF DESCRIPTION OF THE DRAWINGS

The foregoing features of this invention, as well as the invention itself, may be more fully understood from the following description of the drawings in which.

DETAILED DESCRIPTION

Figure 1:
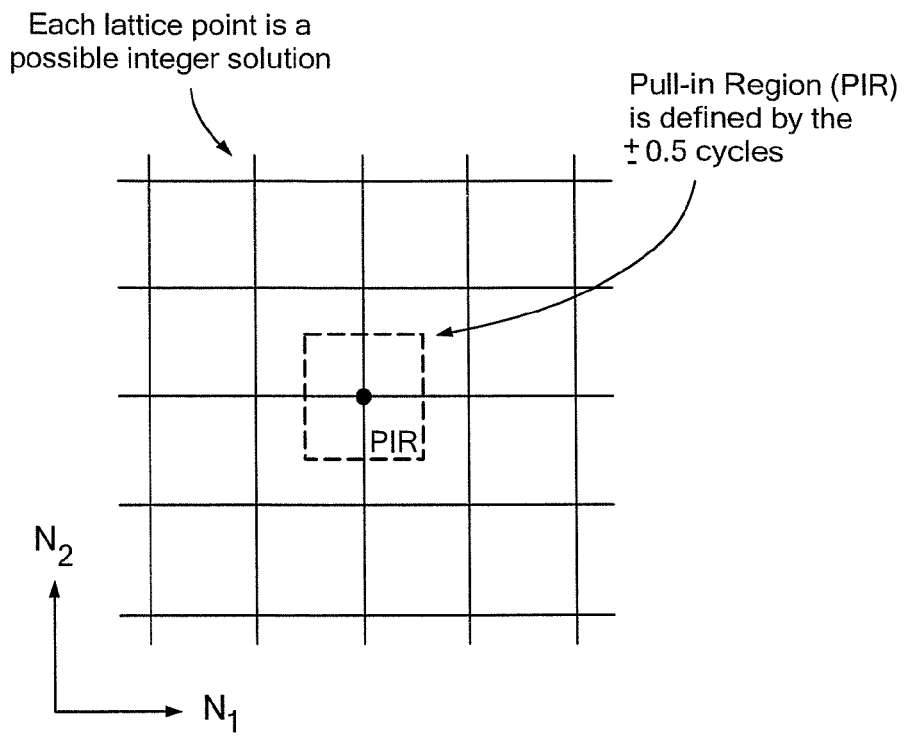
FIG. 1 is a graphical depiction of a prior art pull in region.

The present invention provides methods and apparatus for high accuracy GPS relative navigation. Exemplary applications include joint precision approach landing systems (JPALS) and autonomous airborne refueling (AAR). Such applications can require relative GPS navigation accuracy in the tens of centimeters. Further, these applications demand high integrity in the relative positioning solution to meet stringent safety-of-life requirements.

In an exemplary embodiment, a navigation system runs as part of an airborne platform to provide enhanced accuracy and availability as compared with prior art systems. In general, the inventive processing improves upon existing carrier phase Real Time Kinematic (RTK) fixed solution approaches to compute high integrity bounds of the positioning errors. Embodiments of the invention enhance performance by recognizing that the positioning errors associated with 'small' incorrect ambiguity fixes may be tolerable from certain integrity perspectives. The worst case bias errors in the user's positioning can then be quantified by considering "almost fixed" cases along with the probability that the cases under consideration have actually occurred. The integrity is then quantified by summing the probability for each of the fixed/ almost fixed conditions and by accounting for the worst case errors associated with incorrect integer fixes in the protection level calculations.

Before describing invention embodiments in detail, some introductory material is presented. Real-time kinematic (RTK) carrier phase integer ambiguity resolution or fixing is a known technique used in land survey applications, for example, to provide integer fixing performed with a relatively high degree of certainty. In GPS navigation applications, the pseudo-range or code measurements are unambiguous, but, typically too noisy (resulting from the combined effect of code noise, multipath, and antenna bias errors) to support centimeter level accuracy. On the other hand, the carrier phase measurements are significantly cleaner, but with an ambiguity equaling an integer number of wavelengths.

Conventional techniques are known that employ the dual-frequency divergence-free carrier smoothed code to obtain:

Smoother and less noisy code for navigation position solutions;

Carrier-smoothed-code (CSC) used for carrier phase integer ambiguity fixing; and Float relative positioning solution (float solution) where the integer ambiguities are treated as floats.

In general, after obtaining the float solution, the integer ambiguity fixing is carried out and the fixed ambiguities are then used to compute the fixed relative positioning solution (fixed solution). When the integer ambiguities are correctly fixed, the fixed solution is shown to be sufficient to meet some accuracy requirements. However, the existing approaches fall apart for other applications, such as joint precision approach and landing (JPALS) and autonomous airborne refueling (AAR) applications, because of high integrity requirements, e.g., $1 \times 10^{-6}$, placed on the probability of correct fix (PCF). It is known that such a high requirement on the PCF is not supported by the state-of-the-art sensor technologies when used within the relevant operational environment. The consequence is that only the high integrity float solution is available for relative navigation.

In one example, a joint precision approach and landing (JPALS) application has guidance quality requirements are designed to support the following sea-based relative navigation needs including better than 99% of JPALS system availability, and 95% boarding rate. The 99% percent system availability requirement dictates that the accuracy of relative positioning solution, weighted by the satellite constellation outage statistics, averaged over 24 hour time period and JPALS-defined global sea grids, must be within the accuracy requirement better than 99% of the time. This requirement also dictates that the probability of relative positioning solution outside the computed protection levels must be less than $10^{-6}$, and the computed protection levels must be within the integrity limits.

One issue in using the existing relative navigation approaches is that the float solutions fall far short for an aggressive autoland level of accuracy, and only the fixed solutions can provide the autoland accuracy, but one is unable to fix the integer ambiguities as necessary to obtain a fixed solution with a required high degree of integrity. However, the accuracy requirement only needs to be met better than 99% of the time. It is the integrity requirement that demands the stringent $10^{-6}$ performance. This can be exploited to provide exemplary embodiments discussed in detail below.

In a conventional fixed solution, the PCF is computed by integrating the probability density function (PDF) of the float solution over the pull-in region (PIR), as shown in the two-dimensional prior art FIG. 1. Each lattice point is a possible integer solution. As can be seen, the pull-in region (PIR) is defined by plus/minus 0.5 cycles.

Figure 2:
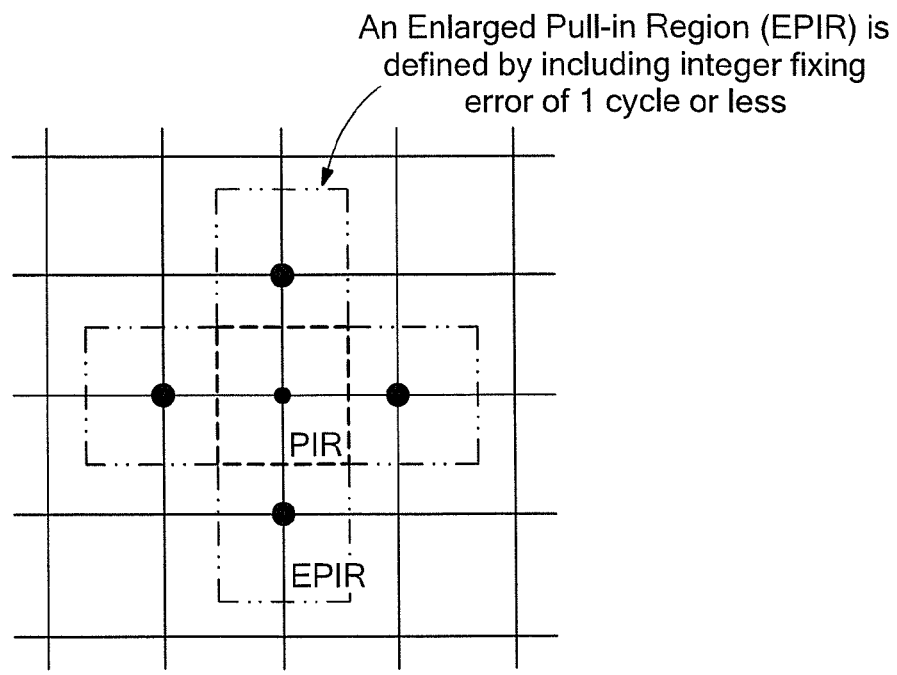
FIG. 2 is a graphical depiction of an enlarged pull-in region.

In accordance with exemplary embodiments of the invention, the accuracy and integrity requirements are treated separately. The relative navigation solution is provided by a fixed solution (wide lane or L1/L2). The PCF in the integer ambiguity resolution only needs to meet the $10^{-3}$ requirement, which sets an upper limit of the system availability at 99.9%. The almost fixed solutions, for which only a few (typically just one) of the integer ambiguities are fixed incorrectly by a small amount (±1, etc.), are lumped together with the correctly fixed solution, forming what is termed an enlarged pull-in region (EPIR), as shown in FIG. 2. As can be seen, the pull in region of FIG. 1 is extended by one cycle to form the EPIR of FIG. 2.

The probability of the float solution inside the EPIR, or the probability of almost fixed (PAF), needs to meet the high integrity requirement of $10^{-6}$. The protection levels can then be computed including the effects of the almost but incorrect fixes in the EPIR. This approach is referred to as almost fixed solutions.

The EPIR is chosen to be sufficiently large to ensure that $$PAF > 1 - 10^{-6} \quad (1)$$

and yet to not excessively increase the protection levels.

In almost fixed solutions, the PCF requirement is effectively lowered from a first, stringent level, such as $10^{-6}$, to a second, more manageable level of $10^{-3}$, for example. The stringent $10^{-6}$ integrity requirement has to be met by the PAF, which is also more manageable since the EPIR region can be chosen to achieve such a requirement. If the increased protection levels are within the integrity limits, the almost fixed solutions effectively and significantly lower the requirement on the GPS sensor error budget for achieving the autoland accuracy.

Figure 3:
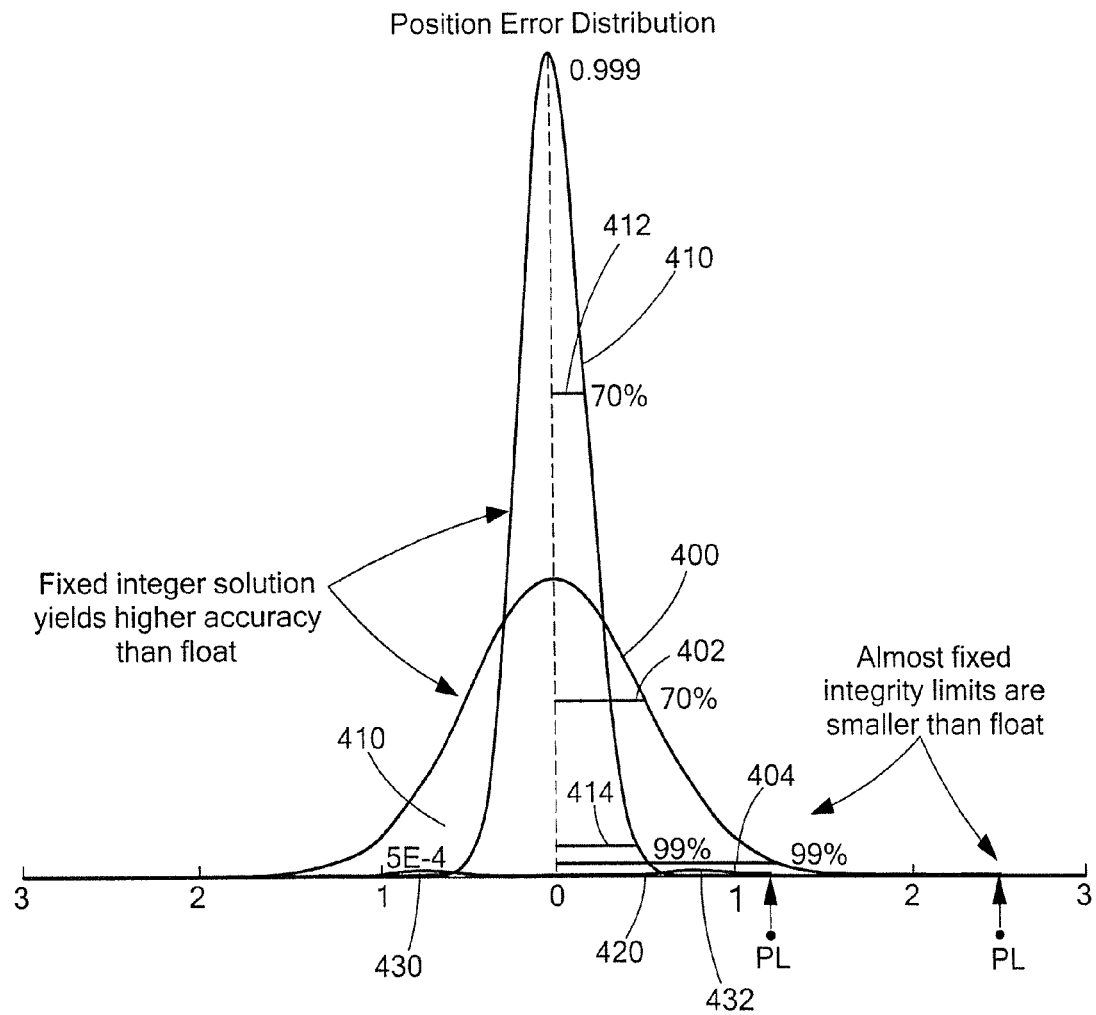
FIG. 3 is a graphical representation of position error distribution.

One can more fully appreciate the justification for the separate treatment of the accuracy and integrity requirements in the almost fixed solutions by looking at a one-dimensional (1-D) example of the position error distribution depicted in FIG. 3, which shows the error distribution for the float solution 400 with the 70% and 99% accuracy and protection levels 402, 404. The narrower error distribution for the correctly fixed solution 410, which is only affected by carrier phase error, is assumed to encompass at least 99.9% probability. As such, the 70% and 99% accuracy levels 412, 414 can be computed completely under this error distribution curve in the almost fixed solutions.

To determine the protection level, indicated by horizontal line 420, under the $10^{-6}$ integrity requirement, one has to look at the two small, off-center error distribution curves 430, 432, each containing about $5 \times 10^{-4}$ probability in this example. As can be seen, this increased protection level due to the almost but incorrect fixes is still significantly less than that of the float solution. Consequently, the almost fixed solutions produce the autoland level of accuracy with reduced protection levels when compared to the float solution.

Figure 4:
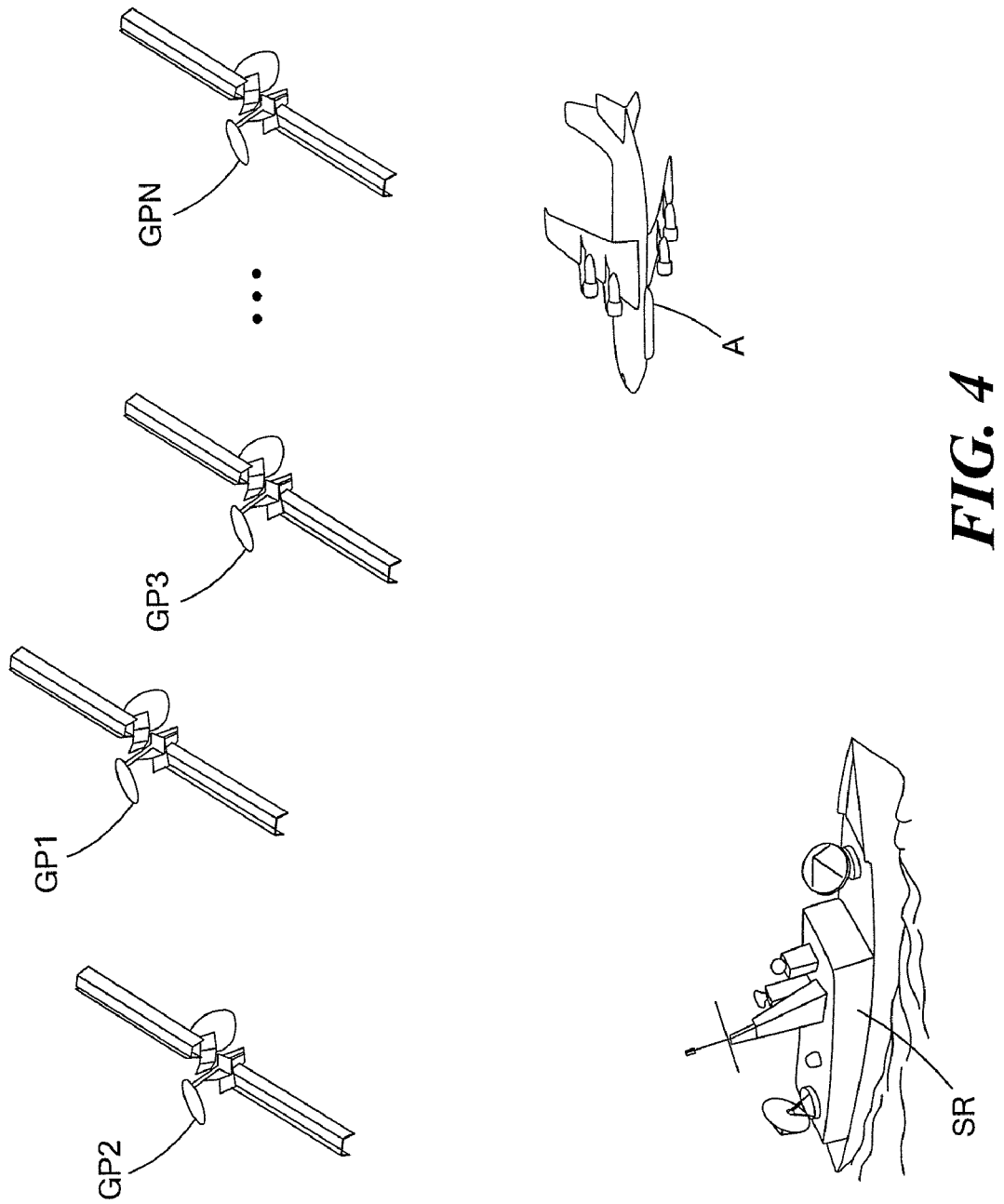
FIG. 4 is a schematic depiction of geometric extra-redundancy.

Now consider a shipboard reference SR and an airborne user GPS receiver A, each simultaneously tracking the same N GPS satellites GP1-N, as shown in FIG. 4. We define a GPS observable, O, which can be raw or smoothed L1/L2 code, L1/L2 carrier phase, or any linear combinations of them such as wide lane (WL) carrier phase and narrow lane (NL) code. The single differenced (SD) observables are defined as:

$$SD_o^i = O_u^i - O_r^i, \quad (2)$$

where: i=1, 2, ..., N is the index of the GPS satellites that are being tracked by both receivers. To form the double differenced (DD) observables, we choose i=1 as the reference satellite (usually the highest elevation satellite). The double differenced observables are thus defined as:

$$DD_o^i = SD_o^i - SD_o^1, \quad (3)$$

and there are N−1 such observables. The main advantage of using the double differenced observables is that both the receiver and satellite clock biases drop out from the observation equations.

By using the double differenced CSC (L1, L2, or NL), and if N is greater than or equal to four, one can solve for the 3-D relative position vector. If the N is greater than four, there are more observables than the number of unknowns, a condition known as geometric redundancy.

In formulating a float solution, one can set up N−1 double difference raw carrier phase and N−1 double differenced CSC observables, yielding 2N−2 equations. There are N+2 unknowns that include a 3-D relative position vector, N−1 of which are carrier phase integer ambiguities. The system of equations is over-determined when N is greater than four, and the number of redundant equations is N−4.

One setup uses the double differenced WL phase and the double differenced carrier-smoothed NL code. For a short baseline, the system of equations is given by:

$$\begin{pmatrix} \varphi_{WL} \\ \rho_{NL} \end{pmatrix} = \begin{pmatrix} G & I \\ G & 0 \end{pmatrix} \cdot \begin{pmatrix} X \\ N_{WL} \end{pmatrix} + \varepsilon, \quad (4)$$

where: $\phi_{WL}$ is the WL phase, $\rho_{NL}$ is the NL code, G is the geometry matrix, I is the identity matrix, X is the baseline vector between the user and the ship, $N_{WL}$ is the WL ambiguities, and $\epsilon$ is the measurement error.

In an exemplary application, such as JPALS, multiple shipboard reference receivers are employed to provide multiple ship reference GPS measurements. Since all the reference receiver measurements are translated to a single ship reference point (SRP) before they are transmitted to the airborne user, the multiple sets of measurements are as if all coming from the SRP.

Additional geometric redundancy is introduced when sending up two or more complete sets of shipboard reference GPS measurements, which are combined with the airborne GPS measurements to solve for a single baseline vector in one set of system of equations. Equation 5 shows the system equations when two sets of reference GPS measurements are used:

$$\begin{pmatrix} \varphi_{WL}^1 \\ \rho_{XL}^1 \\ \varphi_{WL}^2 \\ \rho_{NL}^2 \end{pmatrix} = \begin{pmatrix} G & I & 0 \\ G & 0 & 0 \\ G & 0 & I \\ G & 0 & 0 \end{pmatrix} \cdot \begin{pmatrix} X \\ N_{WL}^1 \\ N_{WL}^2 \end{pmatrix} + \varepsilon, \quad (5)$$

where: 1 and 2 are the data set indices. There are 4N−4 equations and 2N+1 unknowns, yielding 2N−5 number of redundant equations. A simple arithmetic shows that when N equals 8, Equation 5 yields 11 redundant equations, 7 more than what Equation 4 yields. This extra degree of redundancy is termed geometric extra-redundancy.

Availability modeling shows that the geometric extra-redundancy significantly improves both the PCF and PAF, making the most fixed solutions more readily meet the stringent high accuracy and high integrity requirements, such as those in JPALS and potentially in AAR as well.

By combining the above described concepts of geometric extra-redundancy and almost fixed solutions, we arrive at a new, unconventional approach called Geometry Extra-Redundant Almost Fixed Solutions (GERAFS).

Figure 5:
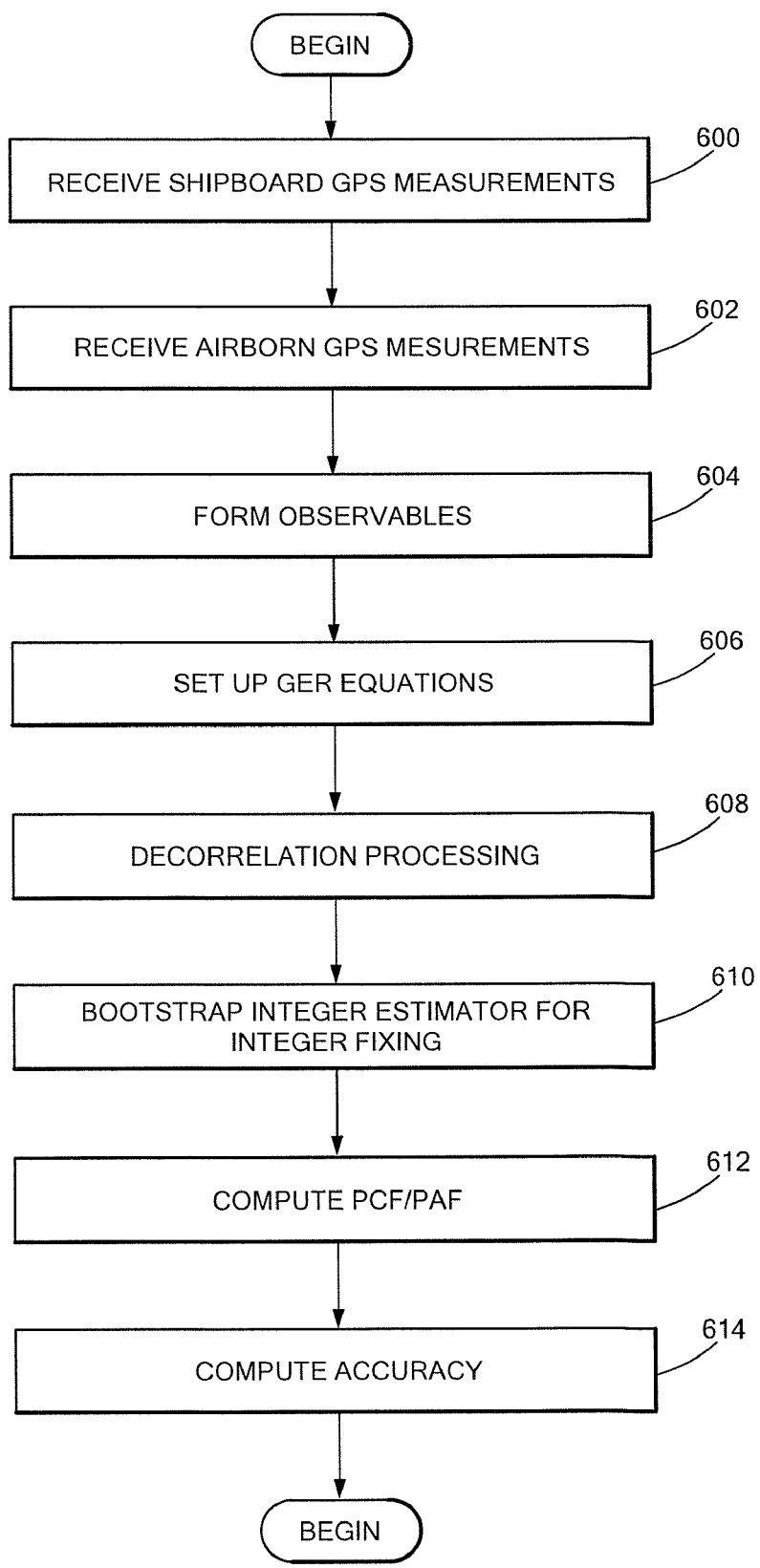
FIG. 5 is a flow diagram showing an exemplary sequence of processing steps.
Figure 6:
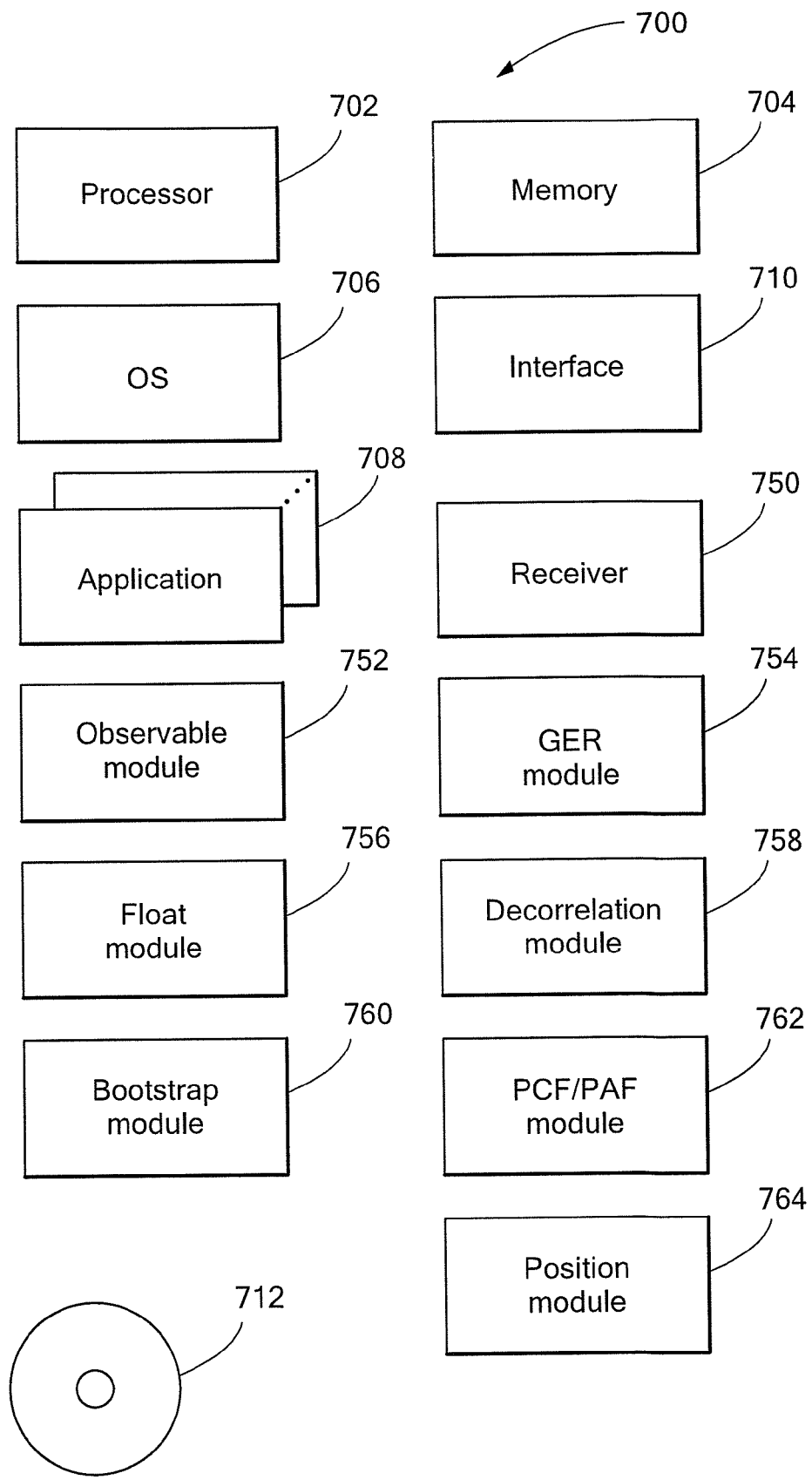
FIG. 6 is a schematic block diagram of a navigation system.

FIG. 5 shows an exemplary sequence of steps for GERAFS processing in conjunction with the exemplary system 700 in FIG. 6 in accordance with exemplary embodiments of the invention. In one embodiment, a system 700 for providing GPS relative navigation in accordance with exemplary embodiments of the invention includes a processor 702 supported by memory 704 under the control of an operating system (OS) 706. A series of applications 108 run on the operating system 706 in a manner well known in the art. The system 700 further includes an interface module 710 to enable communication with other objects in a manner well known to one of ordinary skill in the art. In one embodiment, a disk 712, or any suitable medium, can contain machine-readable instructions that can be executed by one or more computers to perform the inventive processing. Processing is described in detail below.

In step 600, two or more complete sets of shipboard reference GPS receiver measurements are received by a receiver 750. The measurements should be translated to SRP before sending up into the air. In step 602, one or dual sets of airborne GPS receiver measurements are received, depending on whether the particular airborne platform in question is equipped with dual GPS receivers. An observable module 752, in step 604, forms double differenced phase and CSC observables, for example, WL phase/NL code or L1/L2 phase and code, depending on whether L1/L2 ambiguities are fixable in the almost fixed solutions sense (WL ambiguities are easier to fix in terms of meeting PCF and PAF requirements).

In step 606, a GER module 754 sets up the geometric extra-redundant system of equations to solve for a single baseline vector to compute the float solution in a float module 756 and use the WL float solution to guarantee better than 99%, for example, system availability. In step 608, Least-squares AMBiguity Decorrelation Adjustment (LAMBDA), for example, is performed by a decorrelation module 758 to decorrelate double differenced ambiguities. Such decorrelation is well understood by one of ordinary skill in the art. One suitable decorrelation technique is described in Teunissen, P.J.G., "The Least Squares Ambiguity Decorrelation Adjustment: A Method for Fast GPS Integer integer ambiguity Estimation," Journal of Geodesy (1995) 70:65-82, which is incorporated herein by reference.

In step 610, processing for bootstrap integer estimator for integer fixing is performed by bootstrap module 760 to allow for a closed form computation of PCF and PAF. Bootstrap integer estimators are known to one of ordinary skill in the art. One suitable bootstrapping technique is described in Teunissen, P.J.G., "GNSS Ambiguity Bootstrapping: Theory and Application," 2001, which is incorporated herein by reference. When using the bootstrap integer estimator, the PCF has a closed form discussed in this reference, which also provides a closed form formula for computing the probability for any incorrectly fixed solution. The computation of the PAF is therefore obtained by summing up the PCF and each of the probability of almost by incorrect fix.

The PCF is computed in step 612 by a PCF/PAF module 762 and checked to determine whether it satisfies the $10^{-3}$ requirement. The EPIR is formulated so that the PAF meets the $5\times10^{-7}$ requirement, where we allocate $5\times10^{-7}$ out of the total $10^{-6}$ for the integer fixing integrity in this example. The system uses the fixed solution as the relative positioning solution when the PCF and PAF meet their respective requirements. In step 614, a position module 764 computes the relative positioning solution accuracy, which is based on the fixed solution, and the protection levels by including the effect of almost but incorrect fixes on the relative position solution.

It should be noted that the bootstrap integer estimator is far from optimal in the sense of maximizing the PAF towards its theoretical upper bound for a given EPIR. An examination of the underlying probability density function of the float solution reveals that more often than not, a significantly larger PAF upper bound than what is realized by the bootstrapping technique. The suboptimal bootstrapping method used herein is for ease of computing the PCF and PAF and its ability to predict the overall system availability. In other embodiments, it is contemplated that other integer estimators will be used.

The effect of almost but incorrect fixes on the relative positioning solution is relatively straightforward. Since the system of equations used to obtain the fixed solution is linearized, the incorrect integer ambiguity fix simply introduces a bias in the relative positioning solution as follows:

$$(\delta X)_b = (G^T \cdot W \cdot G)^{-1} \cdot G^T \cdot W \cdot Z^T \cdot \delta N, \quad (6)$$

where: $(\delta X)_b$ is the bias in the relative position vector due to the incorrect integer fix, W is the weight matrix, Z is the LAMBDA decorrelation transform matrix, and $\delta N$ is the integer ambiguity deviation vector in the LAMBDA-decorrelated domain associated with the incorrect integer fix.

The vertical protection level is computed as the maximum of the fixed solution derived $5.03\sigma_{vert}$, and the vertical, combinatorial worst case almost but incorrect fixed solution bias (absolute value) within the used EPIR plus $3.49\sigma_{vert}$ when the PCF equals $1-10^{-3}$. If the PCF is larger, the k-factor can be reduced further.

It is understood that the partition between hardware and software can vary to meet the needs of a particular application as will be readily appreciated by one of ordinary skill in the art. Exemplary embodiments of the invention are shown having illustrative partitions of hardware and software. Alternative embodiments having different apportionment between hardware and software to meet the needs of a particular application will be readily apparent to one of ordinary skill in the art. In addition, the inventive processing can be implemented in computer programs executed on programmable computers/machines that each includes a processor, a storage medium or other article of manufacture that is readable by the processor (including volatile and non-volatile memory and/or storage elements), at least one input device, and one or more output devices.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment.

A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
   combining almost fixed solutions with a correctly fixed solution to form an extended pull-in region (EPIR) so that a probability of almost fixed (PAF) over the EPIR meets an integrity allocation; and
   computing, using a processor, protection levels for providing a relative GPS navigation solution including effects of incorrect fixes associated with the almost fixed solutions in the EPIR.

2. The method according to claim 1, further including meeting a probability of correct fix (PCF) threshold in integer ambiguity resolution.

3. The method according to claim 1, further including adding a position domain bias term due to incorrect fixes associated with the almost fixed solutions in the EPIR when calculating the protection levels.

4. The method according to claim 1, further including optimal selection of an EPIR by starting with the correctly-fixed solution and repeatedly adding the next almost fixed solution that has the least amount of resulting position domain bias to the EPIR until the probability of almost fixed (PAF) meets an integrity allocation.

5. A method, comprising:
   generating a relative navigation solution by a fixed solution from the GPS observables;
   computing protection levels by selecting almost fixed solutions with a correctly fixed solution to form an extended pull-in region (EPIR) so that a probability of almost fixed (PAF) over the EPIR meets an integrity allocation;

computing, using a processor, protection levels including effects of incorrect fixes associated with the almost fixed solutions in the EPIR; and outputting a relative navigation solution based upon the fixed solution and protection levels associated with the EPIR.

6. The method according to claim 5, further including using Least-squares AMBiguity Decorrelation Adjustment (LAMBDA) for integer ambiguity decorrelation.

7. The method according to claim 5, further including using bootstrapping for integer estimation.

8. The method according to claim 5, further including performing the relative navigation solution for an automated landing application.

9. The method according to claim 5, further including performing the relative navigation solution for autonomous airborne refueling.

10. A method, comprising:

collecting two or more sets of reference GPS information;

correcting the reference GPS information to a common reference point;

combining, using a processor, the two or more sets of reference GPS information with one or more sets of user GPS information to form two or more sets of GPS observables for relative positioning;

using the two or more sets of combined GPS observables for carrier phase integer ambiguity resolution for a common relative baseline vector;

generating a relative navigation solution by a fixed solution from the GPS observables;

computing protection levels by selecting almost fixed solutions with correctly fixed solution to form an extended pull-in region (EPIR) so that a probability of almost fixed (PAF) over the EPIR meets an integrity allocation;

computing protection levels including effects of incorrect fixes associated with the almost fixed solutions in the EPIR; and outputting a relative navigation solution based upon the fixed solution and protection levels associated with the EPIR.

11. The method according to claim 10, further including generating double differenced observables for the GPS observables.

12. The method according to claim 11, further including decorrelating ambigiuites for the double differenced observables.

13. The method according to claim 10, further including using bootstrap integer estimator for the integer fixing.

14. The method according to claim 10, further including using the fixed solution as the relative positioning solution when the PCF meets a threshold value and the PAF meets an integrity allocation.

15. A system, comprising:

a first module to select almost fixed solutions with a correctly fixed solution to form an extended pull-in region (EPIR) so that a probability of almost fixed (PAF) over the EPIR meets an integrity allocation; and a second module to compute protection levels for relative GPS navigation including effects of incorrect fixes associated with the almost fixed solutions in the EPIR.

16. The system according to claim 15, wherein the first module is capable of meeting a probability of correct fix (PCF) threshold in integer ambiguity resolution.

17. The system according to claim 15, further including a third module to add a position domain bias term due to incorrect fixes associated with the almost fixed solutions in the EPIR when calculating the protection levels.

18. The system according to claim 15, further including a fourth module for optimal selection of an EPIR by starting with the correctly-fixed solution and repeatedly adding the next almost fixed solution that has the least amount of resulting position domain bias to the EPIR until the probability of almost fixed (PAF) meets an integrity allocation.

19. An article, comprising: computer readable instructions stored thereon that enable a machine to perform the steps of:

selecting almost fixed solutions with a correctly fixed solution to form an extended pull-in region (EPIR) so that a probability of almost fixed (PAF) over the EPIR meets an integrity allocation; and computing protection levels for providing a relative GPS navigation solution including effects of incorrect fixes associated with the almost fixed solutions in the EPIR.

20. The article according to claim 19, further including instructions to enable meeting a probability of correct fix (PCF) threshold in integer ambiguity resolution.

21. The article according to claim 19, further including instructions for adding a position domain bias term due to incorrect fixes associated with the almost fixed solutions in the EPIR when calculating the protection levels.

22. The article according to claim 19, further including instructions for optimal selection of an EPIR by starting with the correctly-fixed solution and repeatedly adding the next almost fixed solution that has the least amount of resulting position domain bias to the EPIR until the probability of almost fixed (PAF) meets an integrity allocation.

* * * * *

UNITED STATES PATENT AND TRADEMARK OFFICE
CERTIFICATE OF CORRECTION

PATENT NO. : 7,768,451 B2
APPLICATION NO. : 11/781562
DATED : August 3, 2010
INVENTOR(S) : Wu et al.

It is certified that error appears in the above-identified patent and that said Letters Patent is hereby corrected as shown below:

Col. 1 line 7, delete "know" and replace with -- known --.

Col. 3 line 61, delete "are" and replace with -- that are --.

Col. 5 line 55, delete "$\phi_{WL}$" and replace with -- $\varphi_{WL}$ --.

Signed and Sealed this
Eighth Day of February, 2011

David J. Kappos
*Director of the United States Patent and Trademark Office*